(12) United States Patent
Bramervaer

(10) Patent No.: US 6,455,801 B1
(45) Date of Patent: Sep. 24, 2002

(54) METHOD AND DEVICE FOR MANUFACTURING A PROJECTION WELD CONNECTION FOR PLATE MATERIAL

(75) Inventor: Tom Jansen Bramervaer, Bussum (NL)

(73) Assignee: Arplas Projects BV, Amersfoort (NL)

( * ) Notice: Subject to any disclaimer, the term of this patent is extended or adjusted under 35 U.S.C. 154(b) by 105 days.

(21) Appl. No.: 09/657,212

(22) Filed: Sep. 7, 2000

(51) Int. Cl.$^7$ ................................................ B23K 11/14
(52) U.S. Cl. ....................................... 219/93; 219/117.1
(58) Field of Search ................................. 219/93, 117.1

(56) References Cited

U.S. PATENT DOCUMENTS

| | | | |
|---|---|---|---|
| 4,417,122 A | 11/1983 | Thorne | 218/108 |
| 4,427,869 A | 1/1984 | Kimura et al. | 219/93 |
| 4,461,943 A | 7/1984 | Beauvais | 219/93 |
| 6,281,466 B1 * | 8/2001 | VanOtteren et al. | 219/93 |

FOREIGN PATENT DOCUMENTS

| | | |
|---|---|---|
| DE | 1848297 | 3/1962 |
| WO | WO 9903634 | 1/1999 |

OTHER PUBLICATIONS

Otto, E.A., "Buckelschweissen verkurzt Stuckzeiten"Schweissen und Schneiden, vol. 13 No H4, 1961, pp 146–151.

* cited by examiner

*Primary Examiner*—Clifford C. Shaw
(74) *Attorney, Agent, or Firm*—Hayes Soloway, P.C.

(57) ABSTRACT

A method for manufacturing projection weld connections between plate parts of electrically conductive material such as body parts of automobiles in which a triangular projection is pressed in one of the plate parts, the projection having a rectangular base. Welding takes place under pressure using a pulse of current of about 15,000 to 50,000 amperes for 1 to 10 milliseconds.

5 Claims, 1 Drawing Sheet

METHOD AND DEVICE FOR MANUFACTURING A PROJECTION WELD CONNECTION FOR PLATE MATERIAL

The invention relates to a method for manufacturing a projection weld connection for electrically conductive plate material, such as body parts of automobiles, and parts of plate material for household appliances, such as washing machines, refrigerators, and such.

A method and device of this type is known from U.S. Pat. No. 4,417,122.

This patent concerns a method for manufacturing a projection weld connection for plate material in which a projection is performed in one of the plate parts to be welded, during which the plate parts are compressed in a pressure unit and a pulse of current of a short duration is applied.

This patent concerns the so-called projection welding process, whereby one of the two parts to be welded carries a protruding projection which is pressed with a movable electrode against a fixed welding head, during which the projection welds together against the other plate.

The electrical energy is controlled by means of a circuit during a very short time through the connection to be manufactured.

A great disadvantage with this method is that the electrode leaves a visible imprint in the outer plate surface. These imprints need to be further finished, which on the one hand can take place by grinding, which comprises an extra and expensive manual operation.

On the other hand, this grinding is undesirable for plate surfaces that have been finished with an anti-corrosion surface treatment such as galvanizing or electroplating.

The object of the invention is to provide a method and device for manufacturing a projection weld connection, which does not leave any traces in the visible part, and leaves a strong structural connection capable of making a sturdy connection of the parts without any additional means, such as adhesive, being necessary.

This object is achieved according to the invention in that an oblong projection is formed. whereas the plate parts are pressed together from one side at the location of the projection with a pressure unit applying the one-sided force of between 300 and 1800 Newtons, and the weld is made with a pulse of current of about 15,000–50,000 Amperes during 1 to 10 milliseconds which current is supplied to the overlying plate part from the side of the pressure unit and is removed from the underlying plate part.

For this reason use is made of projections pressed in one of the plate parts, said projections being melted during welding in such a way, that on the opposite side no traces are formed.

Preferably the projections are pressed in the underlying plate at the location of the connection to be manufactured, by which the force of the pressure unit can be kept limited.

The invention will be further elucidated referring to the accompanying drawings wherein.

Figure 2:
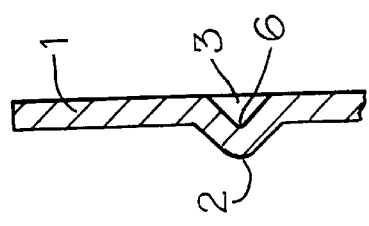
FIG. 2 Shows a cross-section over the line II—II in FIG. 1.
Figure 1:
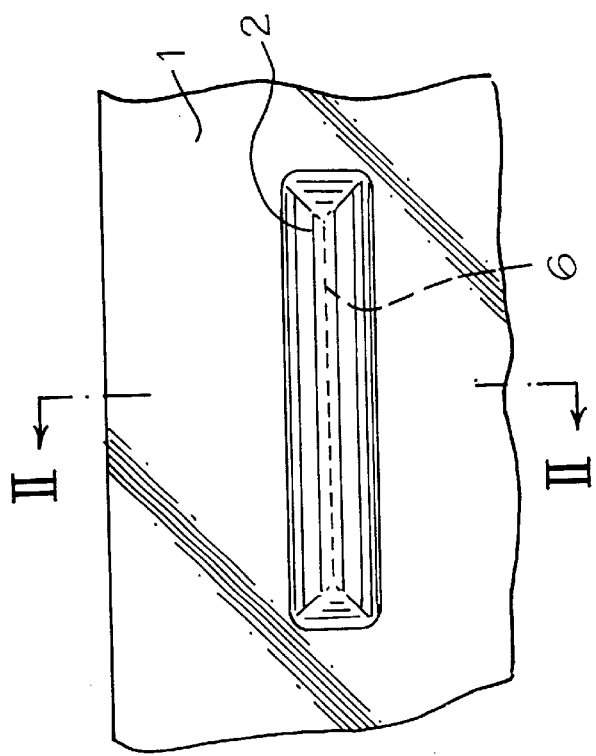
FIG. 1 Shows a plan view of a lower plate part provided with a projection.

According to the drawings FIG. 1 and FIG. 2 an oblong projection (2) has been manufactured during a preliminary operation in the underlying inner plate (1) by pressing a hollow (3) in the material from the lower side by means of a (not shown) pressing tool.

Figure 3:
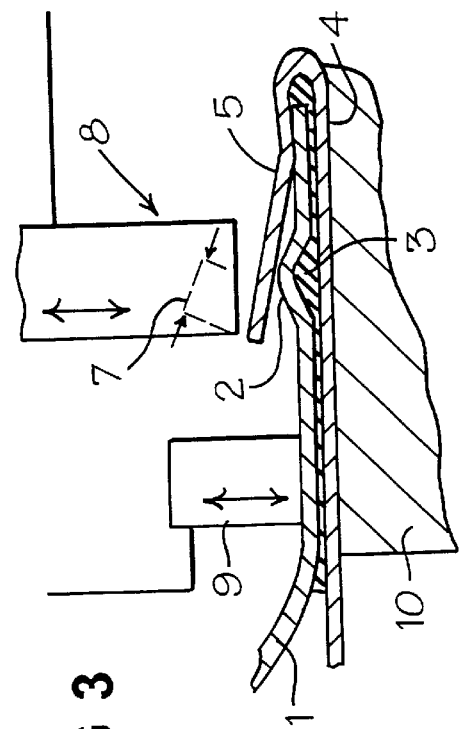
FIG. 3 Shows a cross-section similar to FIG. 2 of the projection weld connection before welding with a pulse of current.

In FIG. 3 a cross-section shows the starting position of a projection weld connection, in which the overlying outer plate (5) rests on the projection (2) and is thereafter folded around the underlying inner plate (1).

The assembly is thereafter compressed in this position by means of a pressure unit (8) which is electrically connected with a (not shown) current source by which a pulse of current can be applied on the overlying plate (5).

A pressure unit (9) rests on the underlying inner plate part (1) by which the current can be removed. By the application of the pulse of current under simultaneous of the pressure-unit (8) the connection comes about.

Preferably a jig or form receiver (10) is present below the plate (4) for taking up the pressure force.

The tool for forming the hollow (3) in the inner plate (1) has on the pressure side an elevation (6) of preferably 1.4×10 mm at the base and a height of the projection (2) that extends from 0.6–0.8 mm above the plate.

The height can vary with the thickness from the plate which is preferably 0.7 mm. The elevation is beveled at the ends under a sharp angle of preferably 45 degrees. The pressure unit (8) (not shown) is executed in such a way that the force can be adjusted between 300 and 1800 Newtons, preferably between 500 and 1100 Newtons.

The placement of the tool for forming the projection (2) is indicated in FIG. 1 with (6). The edge (5) will be executed with an overhand (7) of minimally 1 millimeter, measured from the heart of the projection (2) to the outside of the edge of the overlying plate part (5).

For obtaining an optimal result with which no traces of the projection weld connection can be seen on the outer plate, it is necessary to arrange the current supply in such a way, that a pulse of current from 15,000–50,000 Amperes during 1–10 milliseconds is delivered.

What is claimed is:

1. A method for manufacturing a projection weld connection of an inner and an outer plate, said method comprising the steps of:

providing an inner plate and an outer plate, the inner plate having formed therein an oblong-shaped projection in a location intended for the weld connection;

placing the plates in juxtaposition to overlap one another, with a surface of the outer plate intended to form an exposed surface of the welded connection facing a fixed form receiver or jig;

welding the plates together from the inside at a location of the projection with a movable welding head while applying a force of between 300 and 1800 Newtons and a pulse of current of about 15,000–50,000 Amperes for 1–10 milliseconds to a surface of the inner plate intended to form an inside surface of the welded connection.

2. The method according to claim 1, wherein the oblong-shaped projection is triangular in cross-section, with a rounded top, and having a base length of 8–12 millimeters, a base width of 1–2.4 millimeters, and a height of 0.6–1.3 millimeters.

3. The method according to claim 1, and including the step of folding an edge of the outer plate over the inner plate before welding.

4. The method of claim 3, wherein current is applied to the folded over surface of the outer plate and removed from the inside facing surface of the inner plate.

5. The method according to claim 1, wherein current is applied and removed from the surface intended to form the inside surface of the welded connection.

* * * * *

UNITED STATES PATENT AND TRADEMARK OFFICE
CERTIFICATE OF CORRECTION

PATENT NO. : 6,455,801 B1  Page 1 of 1
DATED : September 24, 2002
INVENTOR(S) : Tom Jansen Bramervaer It is certified that error appears in the above-identified patent and that said Letters Patent is hereby corrected as shown below:

<u>Column 2,</u>
Line 45, insert -- and -- after "jig;".

Signed and Sealed this

Twentieth Day of January, 2004

JON W. DUDAS
*Acting Director of the United States Patent and Trademark Office*